United States Patent
Marchbanks et al.

(10) Patent No.: US 7,797,206 B1
(45) Date of Patent: Sep. 14, 2010

(54) CONSOLIDATED BILLING SYSTEM AND METHOD FOR USE IN TELEPHONY NETWORKS

(75) Inventors: Noel Ray Marchbanks, Plano, TX (US); Webster S. Coffman, Flower Mound, TX (US); Kenneth M. Sager, Irving, TX (US); LeAnn R. Light, Irving, TX (US); Luis A. Roman, Arlington, TX (US); Jonathan D. Macha, Frisco, TX (US)

(73) Assignee: Sprint Communications Company L.P., Overland Park, KS (US)

( * ) Notice: Subject to any disclaimer, the term of this patent is extended or adjusted under 35 U.S.C. 154(b) by 2445 days.

(21) Appl. No.: 09/784,793

(22) Filed: Feb. 15, 2001

Related U.S. Application Data

(63) Continuation of application No. 09/154,962, filed on Sep. 17, 1998, now Pat. No. 6,266,401.

(51) Int. Cl.
*G06Q 40/00* (2006.01)
(52) U.S. Cl. .......................................... 705/34; 705/35
(58) Field of Classification Search .............. 705/34–45
See application file for complete search history.

(56) References Cited

U.S. PATENT DOCUMENTS

| | | | |
|---|---|---|---|
| 7,236,950 B2 * | 6/2007 | Savage et al. | 705/34 |
| 7,236,952 B1 * | 6/2007 | D'Zmura | 705/36 R |

OTHER PUBLICATIONS

FCC, Report No. CC 98-28 Common Carrier AZction Sep. 1998.*
The Wall Street Journal, Telecommunications: Miricle of the Bells: The Simplified Phone Bill, Apr. 12, 1999.*
Saville, A Telecommunications Industry White Paper, Spring 1997.*

* cited by examiner

*Primary Examiner*—Richard C Weisberger

(57) ABSTRACT

A billing system and method particularly well suited for use in telephony networks accounts for usage of standard network services, such as voice and data communication, and third-party services, such as paging and voicemail services, supportable by the network. Customer usage of network equipment and third-party equipment is also accounted for by such a telephony network billing system. Network and third-party usage and equipment charges incurred by a customer are advantageously integrated by the billing system into a single customer invoice.

8 Claims, 20 Drawing Sheets

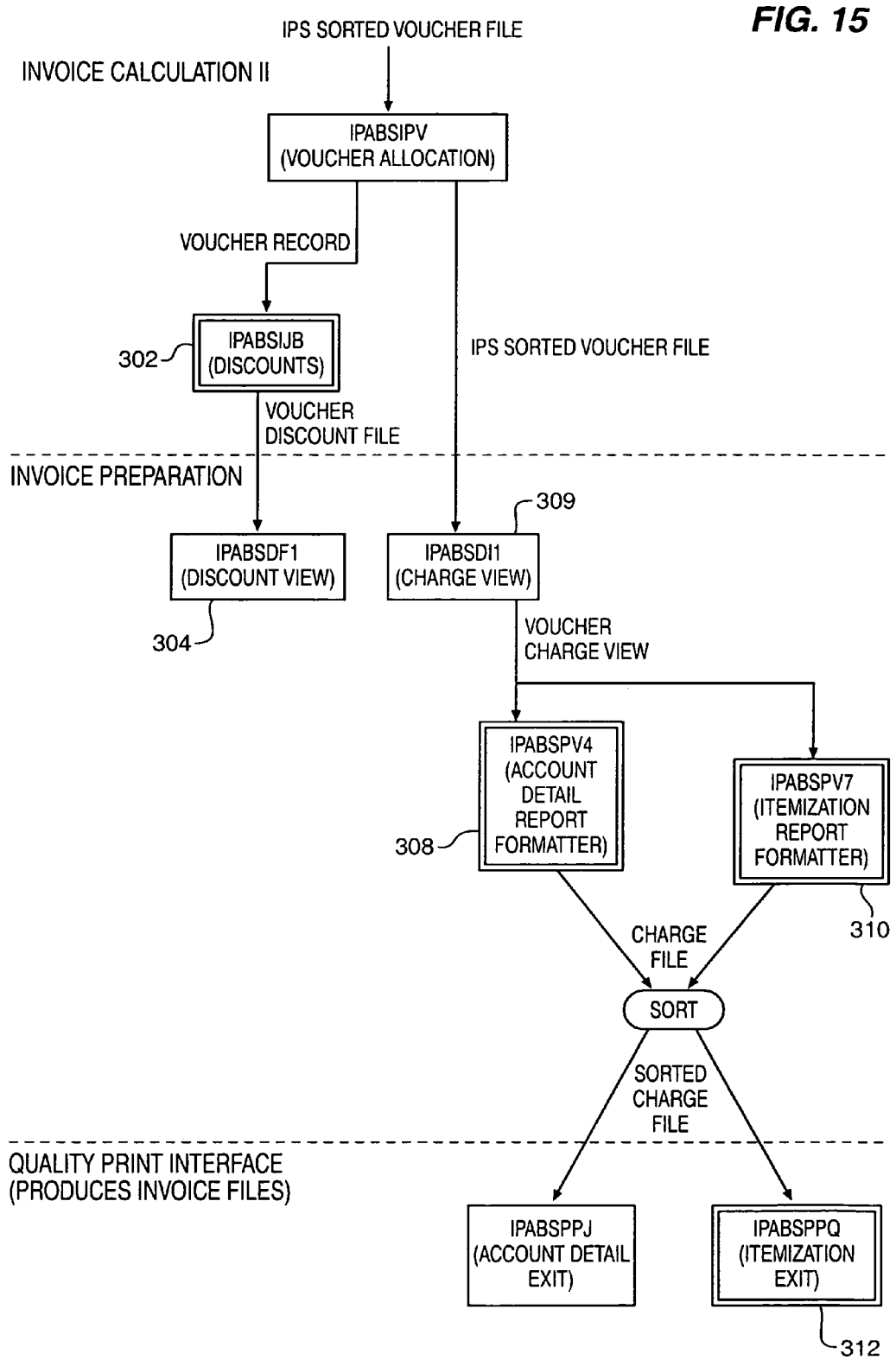

FIG. 16B

NAME  
COMBINED SERVICES  
Page: 2  
Billing Period Ending: 5/15/97  
Customer Number: XXXXXXXX

Account Summary

BALANCE FORWARD

| Description | Date | Amount |
|---|---|---|
| Previous Balance | | $390.01 |
| BALANCE FORWARD | | $390.01 |

MULTIPLE ACCOUNT SUMMARY

| Account | Charges | Discounts | Taxes | Total |
|---|---|---|---|---|
| NAME COMBINE SERVICES 840946563 | $70.00 | $.00 | $3.45 | $73.45 |
| NAME CLARITY - SWITCHED 2 YR 142238123 | 33.12 | -1.33 | 2.86 | 34.65 |
| NAME CLARITY ATLANTIC - DEDICATED 2 YR 142238123 | 455.27 | -3.53 | 3.86 | 455.70 |
| NAME BUSINESS PAGING 157144138 | 660.91 | -7.78 | 39.21 | 692.34 |
| CURRENT TOTAL | $1,219.30 | -$12.64 | $49.48 | $1,256.14 |
| TOTAL AMOUNT DUE - Payable Upon Receipt | | | | $1,646.15 |

Account Detail
NAME
COMBINED SERVICES
ACCOUNT #: XXXXXXXX

CHANGES

| LONG DISTANCE MONTHLY CHARGES | Amount |
|---|---|
| SUMMARY OF CHARGES REPORT | $10.00 |
| DETAIL OF CHARGES REPORT | 10.00 |
| FONVIEW FOR WINDOWS-W/PAPER INVOICE | 25.00 |
| CLARITY SERVICE FEE | 25.00 |
| TOTAL CHARGES | $70.00 |
| CURRENT MONTH SUBTOTAL | $70.00 |

TAXES

| | |
|---|---|
| STATE SALES TAX | $2.70 |
| FEDERAL EXCISE TAX | .75 |
| TOTAL TAXES | $3.45 |
| CURRENT TOTAL - ACCOUNT # XXXXXXXX | $73.45 |

FIG. 16C

NAME  
CLARITY - SWITCHED 2 YR  
ACCOUNT #: YYYYYYYYYY

Page: 3  
Billing Period Ending: 5/15/97  
Customer Number: XXXXXXXXX

Account Detail

CHARGES

| CLARITY - SWITCHED 2 YR | Calls | Minutes | Amount |
|---|---|---|---|
| International | 2 | 12.5 | $13.30 |
| Operator Service | 3 | 9.0 | 19.82 |
| TOTAL CHARGES | 5 | 21.5 | $33.12 |

DISCOUNTS

| CUSTOMER COUNTRY DISC: | UNITED KGDM | -$1.33 |
|---|---|---|
| TOTAL DISCOUNTS | | -$1.33 |
| CURRENT MONTH SUBTOTAL | | $31.79 |

TAXES

| STATE SALES TAX | $1.91 |
|---|---|
| FEDERAL EXCISE TAX | .95 |
| TOTAL TAXES | $2.86 |

| CURRENT TOTAL - ACCOUNT #: YYYYYYYYY | $34.65 |
|---|---|

Itemization of Calls

ORIGINATING NUMBER: 201 555-0776

| Nbr | Date | Time | | Called Location | | Called Nbr | Minutes | Charges |
|---|---|---|---|---|---|---|---|---|
| 1 | 2/13/97 | 3:45 PM | D | NEW YORK | NY | 212 555-2330 | 6.0 | $5.42 |
| | | | | STATION/STATION From JERSEY CITY, NJ 201 555-0776 | | | | |
| TOTAL FOR 201 555-0776 | | | | | | | 6.0 | $5.42 |

ORIGINATING NUMBER: 201 555-0801

| 2 | 2/18/97 | 11:18 AM | D | SWITZERLAND | SL | 41223180130 | 1.0 | $6.40 |
|---|---|---|---|---|---|---|---|---|
| | | | | STATION/STATION From JERSEY CITY, NJ 201 555-0801 | | | | |
| TOTAL FOR 201 555-0801 | | | | | | | 6.0 | $6.40 |

ORIGINATING NUMBER: 201 555-0807

| 3 | 2/11/97 | 7:00 AM | D | UNITEDKGDM | UK | 441712481164 | 4.7 | $5.13 |
|---|---|---|---|---|---|---|---|---|
| TOTAL FOR 201 555-0807 | | | | | | | 4.7 | $5.13 |

ORIGINATING NUMBER: 201 555-0950

| 4 | 2/18/97 | 10:55 AM | D | SWITZERLAND | SL | 41223180130 | 2.0 | $8.00 |
|---|---|---|---|---|---|---|---|---|
| | | | | STATION/STATION From JERSEY CITY, NJ 201 555-0950 | | | | |
| TOTAL FOR 201 555-0950 | | | | | | | 2.0 | $8.00 |

ORIGINATING NUMBER: 201 555-1057

| 5 | 2/19/97 | 8:15 AM | D | UNITEDKGDM | UK | 441712481164 | 7.8 | $8.17 |
|---|---|---|---|---|---|---|---|---|
| TOTAL FOR 201 555-1057 | | | | | | | 7.8 | $8.17 |

| TOTAL ITEMIZATION OF CALLS - ACCOUNT # YYYYYYYYY | 21.5 | $33.12 |
|---|---|---|

\* = The rate in effect at the beginning of the call.  
For a description of rate periods, please see terms and conditions.

FIG. 16D

NAME  
CLARITY ATLANTIC - DEDICATED 2 YR  
ACCOUNT #: YYYYYYYYY

Page: 4  
Billing Period Ending: 5/15/97  
Customer Number: XXXXXXXXX

*Account Detail*

CHARGES

| | Calls | Minutes | Amount |
|---|---|---|---|
| *CLARITY AT;ANTIC - DEDICATED 2 YR* | | | |
| International | 10 | 36.5 | $35.27 |
| SUBTOTAL ITEMIZED CALLS | 10 | 36.5 | $35.27 |

| | Amount |
|---|---|
| *LONG DISTANCE MONTHLY CHARGES* | |
| INTL TCO SERVICE FEE | $100.00 |
| *OTHER CREDITS AND CHARGES* | |
| FACILITY CHARGE | $20.00 |
| TOTAL CHARGES | $455.27 |

DISCOUNTS

| | | |
|---|---|---|
| CUSTOMIZER COUNTRY DISC: | UNITEDKGDM | -$2.69 |
| | GERMANY | -.84 |
| TOTAL DISCOUNTS | | -$3.53 |
| CURRENT MONTH SUBTOTAL | | $451.74 |

TAXES

| | |
|---|---|
| FEDERA; EXCISE TAX | $3.96 |
| TOTAL TAXES | $3.96 |
| CURRENT TOTAL - ACCOUNT # YYYYYYYYY | $466.70 |

*Itemization of Calls*

REFERENCE ID:5869469

| Nbr | Date | Time | | Called Location | | Called Nbr | Minutes | Charges |
|---|---|---|---|---|---|---|---|---|
| 1 | 2/03/97 | 10:17 AM | D | UNITEDKGDM | UK | 441714898033 | 10.9 | $9.28 |
| 2 | 2/03/97 | 10:27 AM | D | GERMANY | GE | 49699201612 | 1.5 | 2.12 |
| 3 | 2/03/97 | 10:31 AM | D | UNITEDKGDM | UK | 441714898033 | 7.0 | 6.12 |
| 4 | 2/03/97 | 10:50 AM | D | UNITEDKGDM | UK | 441243388511 | 5.7 | 5.05 |
| 5 | 2/03/97 | 12:04 AM | D | UNITEDKGDM | UK | 441714898033 | 1.5 | 1.65 |
| 6 | 2/03/97 | 2:04 AM | E | GERMANY | GE | 4989222593 | .5 | .94 |
| 7 | 2/04/97 | 6:39 AM | N | GERMANY | GE | 496920390 | 2.5 | 2.58 |
| 8 | 2/04/97 | 9:15 AM | D | GERMANY | GE | 49699201612 | 2.1 | 2.72 |
| 9 | 2/04/97 | 9:45 AM | D | UNITEDKGDM | UK | 441714898033 | 4.3 | 2.92 |
| 10 | 2/04/97 | 10:31 AM | D | UNITEDKGDM | UK | 441713298595 | .5 | .84 |
| TOTAL FOR 58969469 | | | | | | | 36.5 | $35.27 |
| TOTAL ITEMIZATION OF CALLS - ACCOUNT # YYYYYYYYY | | | | | | | 36.5 | $35.27 |

\* = The rate in effect at the beginning of the call.  
For a description of rate periods. please see terms and conditions.

FIG. 16E

NAME
BUSINESS PAGING
Account #: ZZZZZZZZZ

Page: 5
Billing Period Ending: 5/15/97
Customer Number: XXXXXXXXX

*Account Detail*

CHARGES

| PAGING | Quantity | Amount |
|---|---|---|
| ALPHANUMERIC LOCAL PAGING | 4 | $77.19 |
| NUMERIC LOCAL PAGING | 3 | 27.30 |
| ALPHANUMERIC NATIONAL PAGING CREDIT | 2 | -68.50 |
| NUMERIC NATIONAL PAGING | 5 | 120.00 |
| ALPHANUMERIC REGIONAL PAGING | 3 | 109.20 |
| NUMERIC REGIONAL PAGING | 3 | 67.98 |
| OPERATOR DISPATCH CHARGES | 1 | 1.50 |
| OTHER FEATURES/SERVICES/FEES | 18 | 58.70 |

| OTHER CREDITS AND CHARGES | | |
|---|---|---|
| EQUIPMENT CHARGE | 8 | 267.54 |
| TOTAL CHARGES | | $660.91 |

DISCOUNTS

| NON-USAGE DISCOUNT | -$3.28 |
|---|---|
| CREDIT CARD PROMOTION | -4.50 |
| TOTAL DISCOUNTS | -$7.78 |
| CURRENT MONTH SUBTOTAL | $653.13 |

TAXES

| STATE SALES TAX | $39.21 |
|---|---|
| TOTAL TAXES | $39.21 |

| CURRENT TOTAL - ACCOUNT # ZZZZZZZZZ | $692.34 |
|---|---|

*Itemization of Charges*

PAGING ID:

| | Billing Period | Amount |
|---|---|---|
| DATA SHELF RENTAL | 3/25/97 - 4/15/97 | $8.76 |
| CHANNEL BANK SHELF RENTAL | 3/25/97 - 4/15/97 | 62.78 |
| DATA SHELF INSTALLATION | 3/25/97 - 6/15/97 | FREE |
| CHANNEL BANK SHELF INSTALL | 3/25/97 - 6/15/97 | FREE |
| DATA SHELF RENTAL | 4/16/97 - 5/15/97 | 12.00 |
| CHANNEL BANK SHELF RENTAL | 4/16/97 - 5/15/97 | 86.00 |
| DATA SHELF INSTALLATION | 5/16/97 - 6/15/97 | 12.00 |
| CHANNEL BANK SHELF INSTALL | 5/16/97 - 6/15/97 | 86.00 |
| TOTAL FOR | | $267.54 |

PAGING ID: NNNNNNNNN

| | Billing Period | Amount |
|---|---|---|
| ALPHA REGIONAL BUNDLED PAGER RENTAL | 3/25/97 - 4/15/97 | $29.20 |
| ALPHA REGIONAL BUNDLED PAGER RENTAL | 4/16/97 - 5/15/97 | 40.00 |
| ALPHA REGIONAL BUNDLED PAGER RENTAL | 5/16/97 - 6/15/97 | 40.00 |
| 800/PIN ALPHA RETRIEVAL | 3/25/97 - 4/15/97 | 1.46 |
| 800/PIN ALPHA RETRIEVAL | 4/16/97 - 5/15/97 | 2.00 |

FIG. 16F

NAME  
BUSINESS PAGING  
Account #: ZZZZZZZZ

Page: 6  
Billing Period Ending: 5/15/97  
Customer Number: XXXXXXXXX

*Itemization of Charges*

PAGING ID: NNNNNNNNN

| | Billing Period | Amount |
|---|---|---|
| 800/PIN ALPHA RETRIEVAL | 5/16/97 - 6/15/97 | $2.00 |
| TOTAL FOR: NNNNNNNNN | | $114.65 |

PAGING ID: NNNNNNNNN

| | Billing Period | Amount |
|---|---|---|
| NUMERIC REGIONAL UNBUNDLED PAGER RENTAL | 3/25/97 - 4/15/97 | $18.18 |
| NUMERIC REGIONAL UNBUNDLED PAGER RENTAL | 4/16/97 - 5/15/97 | 24.90 |
| NUMERIC REGIONAL UNBUNDLED PAGER RENTAL | 5/16/97 - 6/15/97 | 24.90 |
| PERSONAL 800 PAGER PROTECT NUMERIC RETR | 3/25/97 - 4/15/97 | 7.25 |
| PERSONAL 800 PAGER PROTECT NUMERIC RETR | 4/16/97 - 5/15/97 | 7.25 |
| PERSONAL 800 PAGER PROTECT NUMERIC RETR | 5/16/97 - 6/15/97 | 7.25 |
| TOTAL FOR: NNNNNNNNN | | $87.77 |

PAGING ID: AAAAAAAAA

| | Billing Period | Amount |
|---|---|---|
| NUMERIC NATIONAL BUNDLED PAGER RENTAL | 3/25/97 - 4/01/97 | $8.10 |
| NUMERIC NATIONAL BUNDLED PAGER RENTAL | 4/02/97 - 5/01/97 | 30.00 |
| 800/PIN PAGER PROTECTION | 3/25/97 - 4/15/97 | 1.10 |
| 800/PIN PAGER PROTECTION | 4/16/97 - 5/15/97 | 1.50 |
| 800/PIN PAGER PROTECTION | 5/16/97 - 6/15/97 | 1.50 |
| TOTAL FOR: AAAAAAAAA | | $42.20 |

PAGING ID: BBBBBBBBB

| | Billing Period | Amount |
|---|---|---|
| NUMERIC NATIONAL BUNDLED PAGER RENTAL | 3/25/97 - 4/15/97 | $21.90 |
| NUMERIC NATIONAL BUNDLED PAGER RENTAL | 4/16/97 - 5/15/97 | 30.00 |
| NUMERIC NATIONAL BUNDLED PAGER RENTAL | 5/16/97 - 6/15/97 | 30.00 |
| 800/PIN PAGER PROTECTION | 3/25/97 - 4/15/97 | 1.10 |
| 800/PIN PAGER PROTECTION | 4/16/97 - 5/15/97 | 1.50 |
| 800/PIN PAGER PROTECTION | 5/16/97 - 6/15/97 | 1.50 |
| TOTAL FOR: BBBBBBBBB | | $86.00 |

PAGING ID: CCCCCCCCC

| | Billing Period | Amount |
|---|---|---|
| NUMERIC LOCAL BUNDLED PAGER RENTAL | 3/25/97 - 4/15/97 | $7.30 |
| NUMERIC LOCAL BUNDLED PAGER RENTAL | 4/16/97 - 5/15/97 | 10.00 |
| NUMERIC LOCAL BUNDLED PAGER RENTAL | 5/16/97 - 6/15/97 | 10.00 |
| 800/PIN PAGER PROTECTION NUMERIC RETRIEV | 3/25/97 - 4/15/97 | 1.64 |
| 800/PIN PAGER PROTECTION NUMERIC RETRIEV | 4/16/97 - 5/15/97 | 2.25 |
| 800/PIN PAGER PROTECTION NUMERIC RETRIEV | 5/16/97 - 6/15/97 | 2.25 |
| TOTAL FOR: CCCCCCCCC | | $33.44 |

PAGING ID: DDDDDDDDD

| | Billing Period | Amount |
|---|---|---|
| ALPHA LOCAL UNBUNDLED PAGER RENTAL | 3/14/97 - 3/15/97 | $2.48 |
| ALPHA LOCAL UNBUNDLED PAGER RENTAL | 3/16/97 - 4/15/97 | 24.90 |
| ALPHA LOCAL UNBUNDLED PAGER RENTAL | 4/15/97 - 6/15/97 | 24.90 |
| ALPHA LOCAL UNBUNDLED PAGER RENTAL | 5/16/97 - 6/15/97 | 24.90 |
| TOTAL FOR: DDDDDDDDD | | $77.19 |

FIG. 16G

NAME  
BUSINESS PAGING  
Account #: ZZZZZZZZ

Page: 7  
Billing Period Ending: 5/15/97  
Customer Number: XXXXXXXXX

*Itemization of Charges*

PAGING ID: EEEEEEEE

| | Billing Period | Amount |
|---|---|---|
| ALPHA NATIONAL BUNDLED PAGER RENTAL CREDI | 4/04/97 - 4/15/97 | -$18.50 |
| ALPHA NATIONAL BUNDLED PAGER RENTAL CREDI | 4/16/97 - 5/15/97 | -50.00 |
| PERSONAL 800 PAGER ALPHA RETRIEVAL | 3/25/97 - 4/15/97 | 5.11 |
| PERSONAL 800 PAGER ALPHA RETRIEVAL | 4/15/97 - 5/15/97 | 7.00 |
| PERSONAL 800 PAGER ALPHA RETRIEVAL | 5/15/97 - 6/15/97 | 7.00 |
| TOTAL FOR: EEEEEEEE | | -$49.39 |

PAGING ID: FFFFFFFF

| | Billing Period | Amount |
|---|---|---|
| OPERATOR DISPATCH/3 PAGES @ $.50 EACH | 4/02/97 - 5/02/97 | $1.50 |
| TOTAL FOR: FFFFFFFF | | $1.50 |

| | |
|---|---|
| TOTAL ITEMIZATION OF CHARGES - ACCOUNT # ZZZZZZZZ | $660.91 |

# CONSOLIDATED BILLING SYSTEM AND METHOD FOR USE IN TELEPHONY NETWORKS

RELATED APPLICATIONS

This application is a continuation of prior application Ser. No. 09/154,962 filed Sep. 17, 1998, entitled "CONSOLIDATED BILLING SYSTEM AND METHOD FOR USE IN TELEPHONY NETWORKS."

FIELD OF THE INVENTION

The present invention relates generally to billing systems for telephony networks, and more particularly, to a system and method of integrating billing information acquired from a third-party service provider with network billing information and producing consolidated customer invoices for usage of network and third-party services and equipment.

BACKGROUND OF THE INVENTION

Telephone service providers typically employ a billing system to produce monthly invoices based on customer usage of telephony network resources and equipment. Such conventional billing systems typically constitute an amalgam of disparate computer and data processing systems which must cooperate harmoniously in order to produce a great number of customer invoices on a cyclical basis. Modifying such billing systems to accommodate new services and functionality presents a significant challenge to the providers of telephony network services. Current telephony network billing systems are generally unable to support additional billing requirements necessary to expand the scope of services which can be offered by telephony network service providers.

It can be appreciated that modifying a complex billing system that processes tens of millions of customer invoices each month is both a problematic and expensive proposition. The inability to effect such modifications, however, can result in a loss of market share and a reduction in the future growth of telecommunications companies which typically compete for business within a common customer pool. There is a need in the telecommunications industry for a billing system and methodology that can accommodate current and future telephony network service billing requirements. There exists a further need for such a billing system which does not require significant redesign of existing billing system architecture. The present invention fulfills these and other needs.

SUMMARY OF THE INVENTION

The present invention is directed to a billing system and method particularly well suited for use in telephony networks. A billing system and methodology that operates in accordance with the principles of the present invention accounts for usage of standard network services, such as voice and data communication, and third-party services, such as paging and voicemail services, supportable by the network. Customer usage of network equipment and third-party equipment is also accounted for by a telephony network billing system operating in accordance with the principles of the present invention. Network and third-party usage and equipment charges incurred by a customer are advantageously integrated by the billing system into a single customer invoice.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

BRIEF DESCRIPTION OF THE DRAWINGS

FIGS. 12-15 illustrate various processing modules and data flows associated with the process steps depicted in FIG. 11; and FIGS. 16A-16G illustrate various pages of an illustrative customer invoice that includes equipment and usage charge information for both paging and non-paging services.

Figure 1:
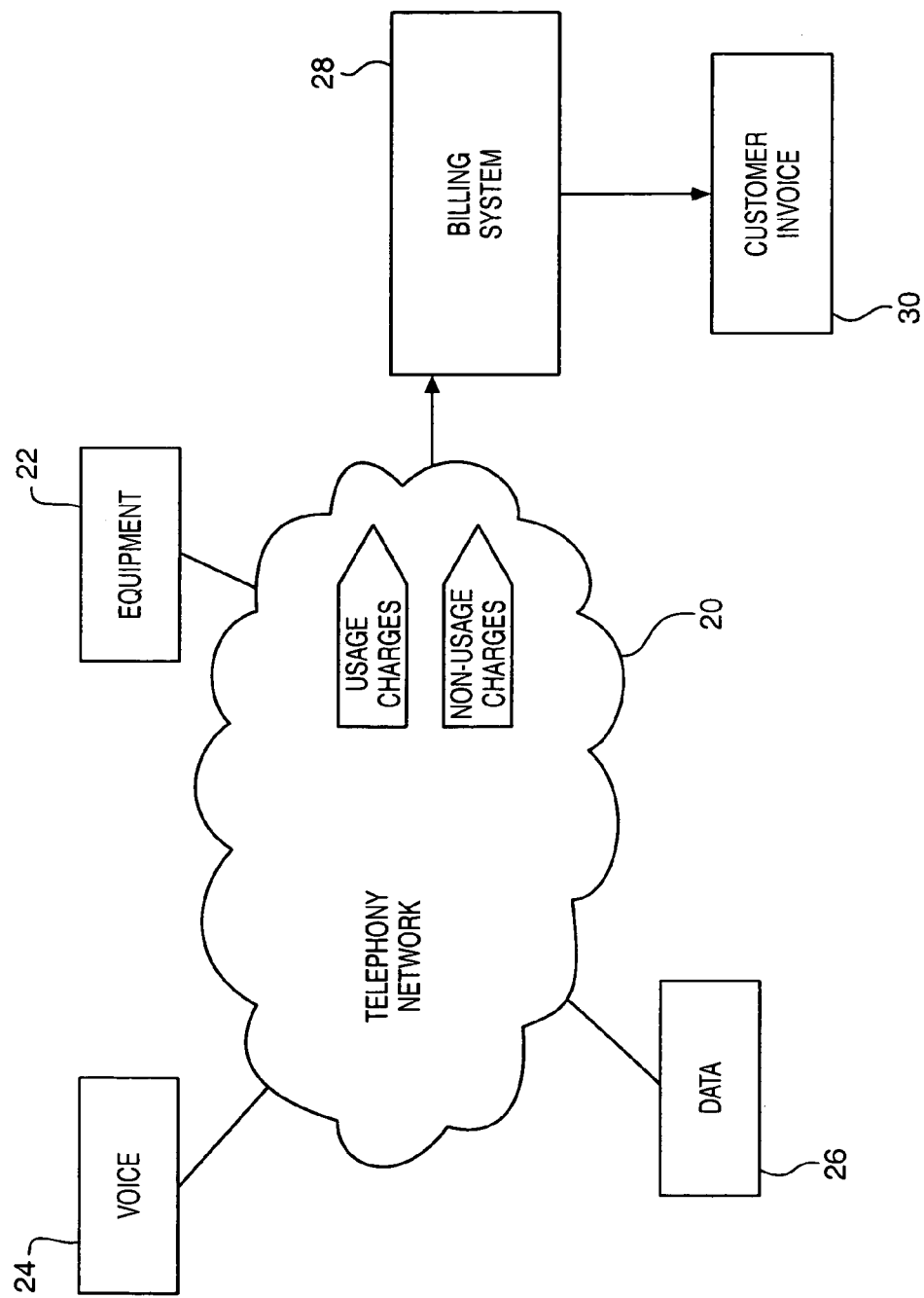
FIG. 1 is an illustration of a conventional telephony network over which voice and data information is typically communicated, with usage and non-usage charges accounted for by a computer-based billing system.
Figure 2:
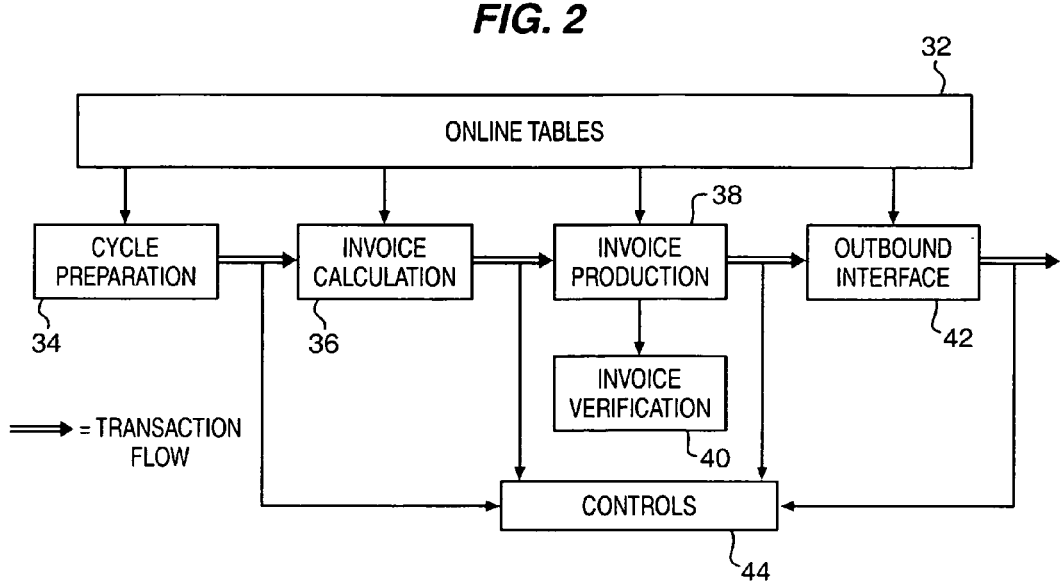
FIGS. 2-5 illustrate various processing modules and associated data flows concerning an invoice processing methodology in accordance with one embodiment of the present invention.
Figure 3:
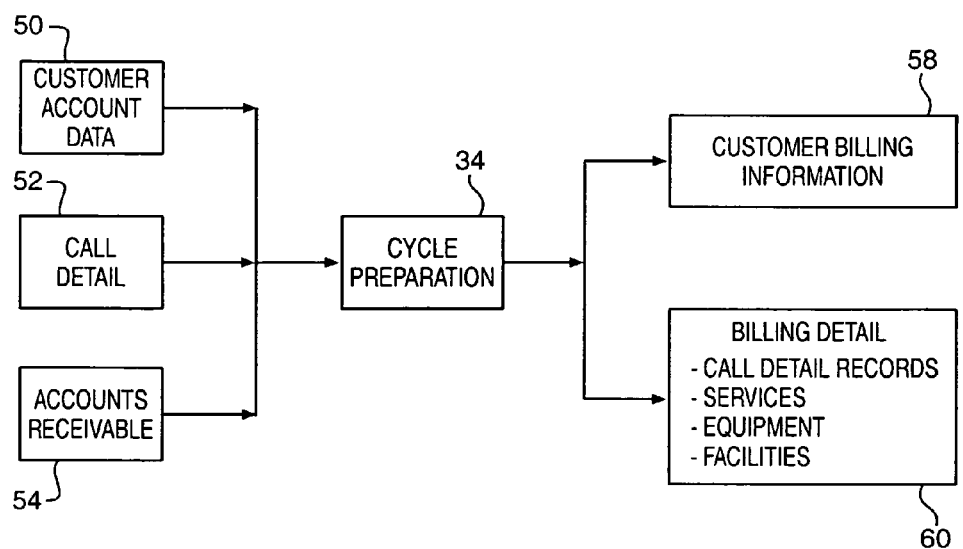
Figure 4:
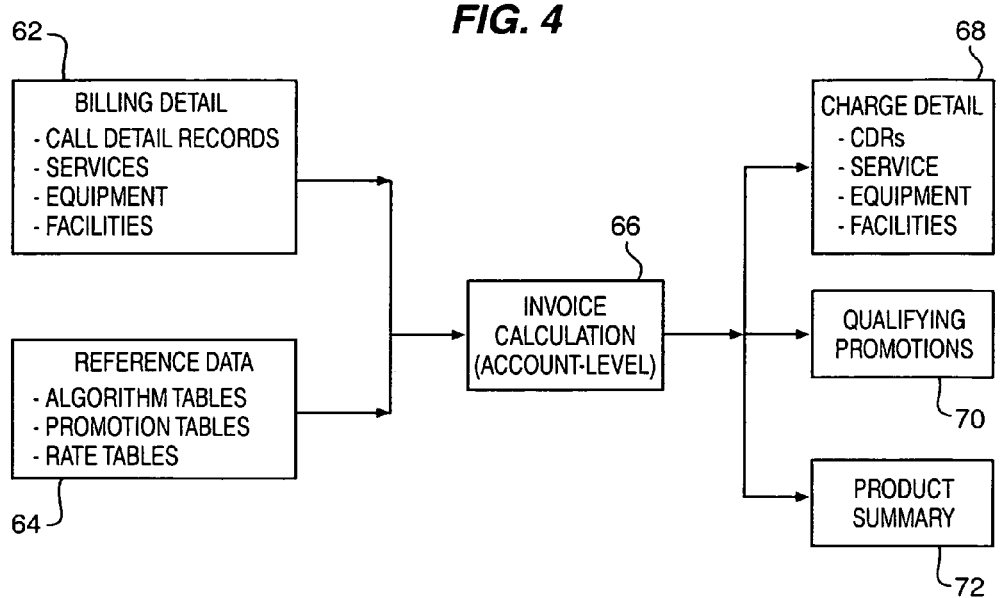
Figure 5:
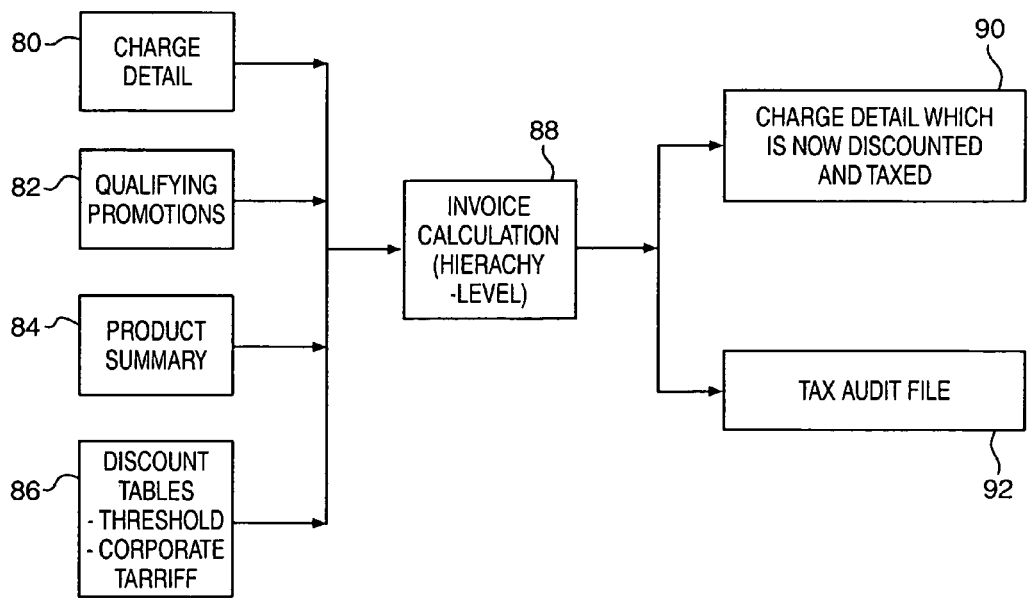

While the invention is amenable to various modifications and alternative forms, specifics thereof have been shown by way of example in the drawings and will be described in detail hereinbelow. It is to be understood, however, that the intention is not to limit the invention to the particular embodiments described. On the contrary, the invention is intended to cover all modifications, equivalents, and alternatives falling within the spirit and scope of the invention as defined by the appended claims.

DETAILED DESCRIPTION OF THE VARIOUS EMBODIMENTS

In the following description of the illustrated embodiments, references are made to the accompanying drawings which form a part hereof, and in which is shown by way of illustration, various embodiments in which the invention may be practiced. It is to be understood that other embodiments may be utilized, and structural and functional changes may be made without departing from the scope of the present invention.

Referring now to the drawings, and more particularly to FIG. 1, there is illustrated a generalized block diagram of a conventional telephony network 20 over which voice information 24 and data 26 may be communicated. Various types of equipment 22, such as telephones and modems for example, provide access to the telephony network 20. A typical network 20 includes a billing system 28 which accounts for customer use of the telephony network infrastructure (e.g., usage charges) and equipment rental (e.g., non-usage charges).

Usage and non-usage charge information is acquired and processed by a conventional billing system 28 to produce, for example, a customer invoice 30. It is noted that acquiring and processing equipment and network usage charge information within the context of a conventional billing systems 28 is often accomplished using a number of disparate systems and processing methodologies. A final merging of dissimilar usage and non-usage charge data streams is typically required in order to consolidate all applicable customer charges on a single invoice.

Those skilled in the art of invoicing and billing systems for use in telephony networks appreciate the substantial effort and expenditure required to coordinate a myriad of data acquisition and processing methodologies in order to accurately produce customer invoices on a cyclical basis. By way of example, U.S. Sprint, through considerable effort and cost, has developed an Invoice Processing System (IPS) which represents the industry's first consolidated invoicing and telemanagement reporting system for residential and business customers. The IPS replaced some nine individual billing systems, and provides invoicing and reporting capabilities sufficient to support in excess of 10 million customers served by U.S. Sprint.

The Invoice Processing System originally developed by U.S. Sprint provides for the efficient processing of voice 24, data 26, and equipment 22 usage within a telephony network 20. Those skilled in the art will readily appreciate the complexity of a billing system infrastructure which efficiently and accurately processes on the order of tens of millions of customer usage and non-usage charges on a monthly basis. Notwithstanding the sophistication of the original IPS and other conventional billing systems, the present consumer demand for new technologies and services, such as voicemail and paging services for example, has presented new and challenging problems to the designers of billing system architecture for telephony networks.

A billing system and methodology in accordance with the principles of the present invention provides for consolidated accounting of present and future services and features supportable by a telephony network. Charges associated with services and equipment offered by third-party service providers (i.e., non-telephony network service/equipment providers), such as paging and voicemail service providers, are seamlessly integrated along with standard service (e.g., voice and data) charges to produce consolidated customer invoices.

FIGS. 2-6 illustrate various aspects of one embodiment of a billing system infrastructure within which the present invention may be utilized. Customer billing may be processed in two separate phases. The first phase, which may be referred to as call processing, acquires call or usage data from the telephony network 20 and performs a series of edits. During this phase, the data is batched, formatted, reviewed, authorized, and rated. A Message Processing System (MPS) prepares the call data for the next phase of the billing process.

Figure 6:
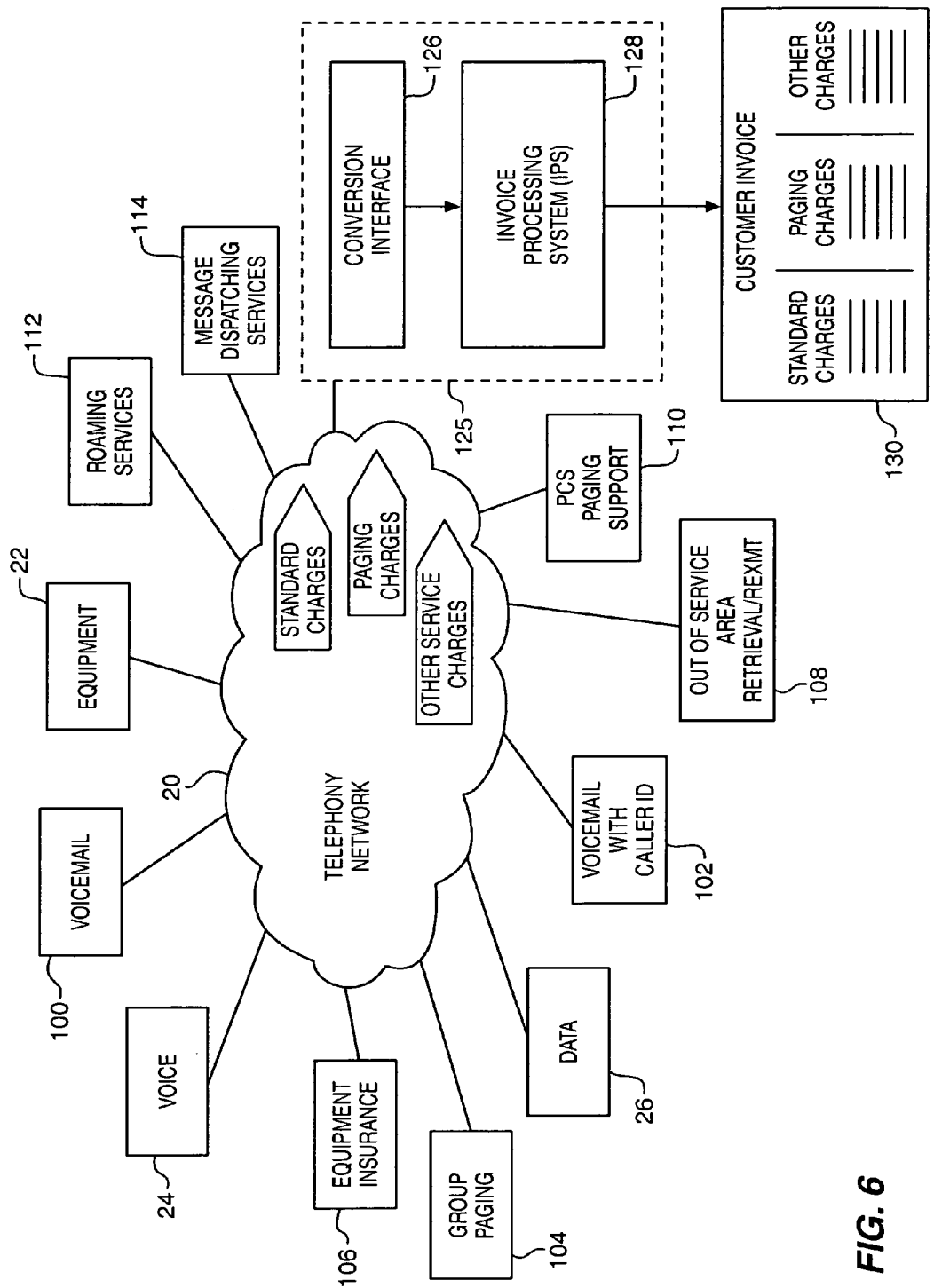
FIG. 6 illustrates an expanded set of services and features which may be supported by a telephony network, the billing of which is provided through use of an invoice processing system and methodology in accordance with an embodiment of the present invention.

The second phase, which may be referred to as invoicing, acquires the call records, aggregates them by cycle and customer, and then prepares the actual customer invoices. An Invoice Processing System 128, which is shown in FIG. 6, performs the invoicing functions through use of seven major subsystems, including an online tables subsystem 32, a cycle preparation subsystem 34, an invoice calculation subsystem 36, invoice verification and production subsystems 40, 38, a controls and reporting subsystem 44, and an outbound interface subsystem 42. The controls and reporting subsystem 44 and outbound interface subsystem 42 respectively establish parameters for internal IPS design management and data flow to and from various system databases.

The online tables subsystem 32 drives the invoicing process. Among the many functions performed by the online tables subsystem 32 are defining billing run parameters, maintaining product and rate structures, and specifying report requirements for customer billing.

After determining the parameters for a specific cycle set up, the IPS module 128 pulls the appropriate call detail records from the Message Processing System and sequences a customer's data acquired from other systems, such as from the Customer Information System (CIS), Enterprise System (ES), accounts receivable system, and other systems. Finally, the cycle preparation subsystem 34 allows special billing requests, such as those outside of their normal cycle, to be processed.

The calculation of invoices is a primary operation performed by the IPS module 128. Invoice calculation may be viewed as being effected through two major sets of operations, namely, Calculation I and Calculation II processing operations. The Calculation I process acquires the authorized customer profile and applies all account-level monthly recurring, non-recurring, and usage charges, as well as account-specific discounts. Charges are determined by various algorithms and rate tables. For tapered 800 and WATS services, for example, the call detail records are re-rated according to applicable tariff requirements.

The Calculation II process is used to process hierarchical structures, discounts, and commissions (e.g., public phones). During the Calculation II process, hierarchical-level discounts are computed where applicable. The Calculation II process then applies promotions and discounts, as well as determining taxes at the call level after all discounts have been applied.

Prior to printing invoices and reports, the IPS module 128 verifies that all information on randomly selected customers within a given cycle is accurate. During this verification operation, the IPS module 128 checks its own processing by reviewing sampling invoices for each customer profile type contained in the cycle. Among the more than 350 verification parameters checked are rates, time of day, product, promotions, and taxes.

After the accuracy of the sample invoice data has been verified, the IPS module 128 decouples the invoices and telemanagement reports and creates electronic images for final production in the media formats selected by a customer. Invoices are printed and then dispatched to the applicable customers.

Referring to FIG. 6 in greater detail, there is depicted a telephony network 20 which supports basic voice 24, data 26, and equipment 22 services, along with a number of new services and features not contemplated at the time of the initial telephony network design. Services such as voicemail 100, voicemail with caller ID 102, paging and group paging 104, roaming services 112, and message dispatching services 114 have become popular services which are routinely requested by the consumer. Other services, such as equipment insurance 106, out of service area message retrieval and retransmission 108, and PCS paging support 110 are examples of new services which are believed to be of interest to the consumer.

Present telephony network billing systems are currently incapable of accounting for new and standard services and features such that all charges for all services and features contracted by a customer, including third-party services, are presented in a single consolidated customer invoice. The inability of present billing systems to account for usage and non-usage charges for new services and features significantly limits the ability of telephony service providers to introduce such services and features to current and future customers.

For purposes of illustration and not of limitation, various features and advantages of the present invention will now be described within the context of new paging services offered by a third-party service provider which are supported by the telephony network depicted in FIG. 6. It is to be understood that the following description with respect to paging services is not intended to limit the scope of the present invention. Other services, including those yet to be developed, which may utilize the telephony network 20 and be accounted for in a manner consistent with the principles of the present invention come within the scope of the present invention.

In accordance with the embodiment illustrated in FIG. 6, an integration interface 126 cooperates with an Invoice Processing System 128 to account for all network and third-party services and features supportable by the telephony network 20. As is depicted in FIG. 6, the integration interface 126 provides for the acquisition and pre-processing of standard usage and non-usage charges (e.g., for voice and data services/equipment), paging charges (e.g., for pager and voice-mail services/equipment), and other service charges for subsequent processing by the IPS module 128.

Enhancements in IPS functionality, as will be described hereinbelow, provides for the incorporation of usage and non-usage charges for new services and features along with standard usage and non-usage charges for presentation on a customer invoice 130. Cooperation between the IPS module 128 and integration interface 126 provides the opportunity for telephony network service providers to expand the type and nature of services and features which may be offered to the consumer.

Figure 7:
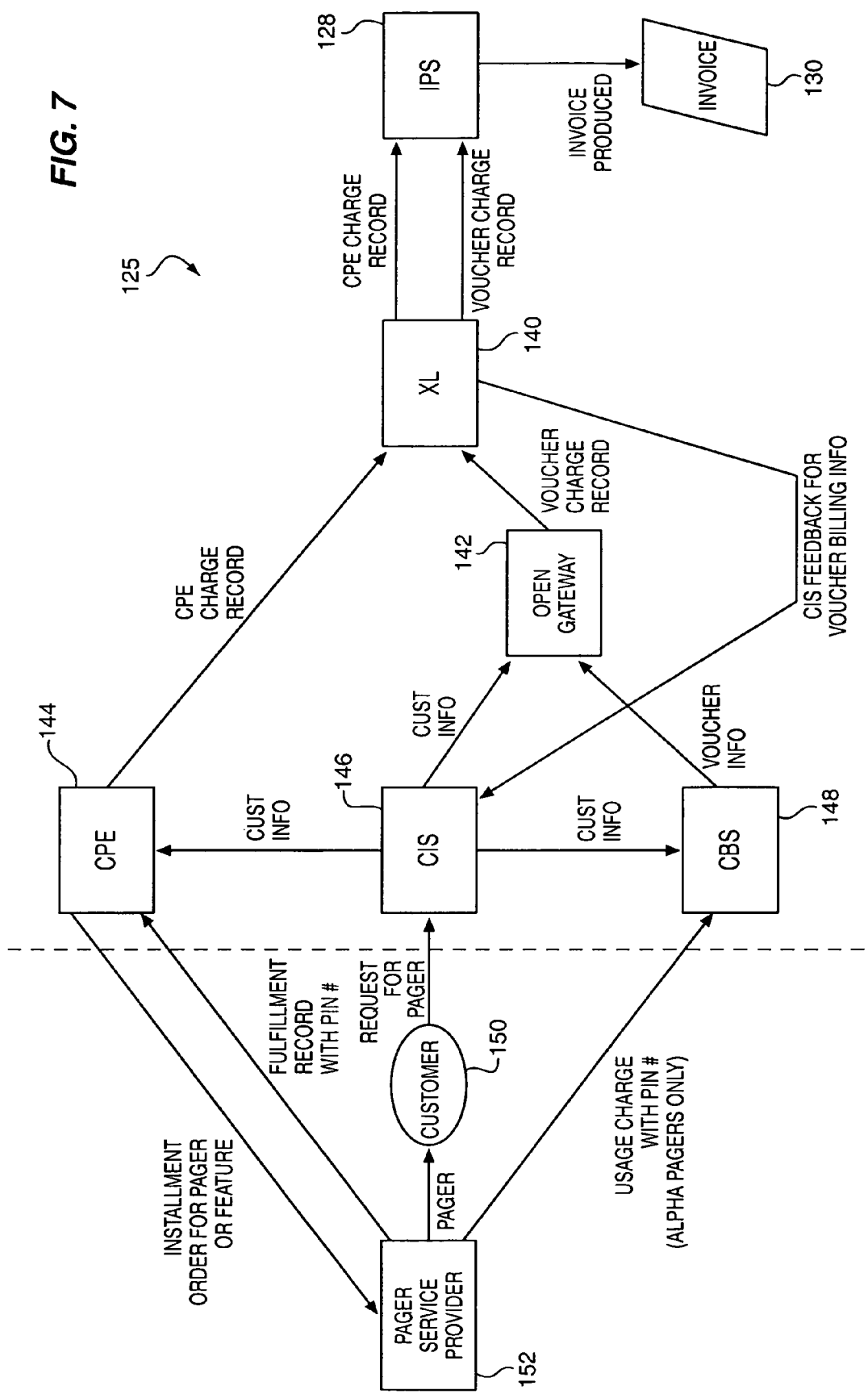
FIG. 7 illustrates various processing modules and data flows which provide for the integration of billing information acquired from a third-party service provider with network billing information, and the production of consolidated customer invoices for usage of network and third-party services and equipment.

Referring now to the system block diagram of FIG. 7 and process flowcharts of FIGS. 8-11, there is illustrated one embodiment of the present invention in which a telephony network of the type illustrated in FIG. 6 has been expanded to include new paging services. The system illustrated in FIG. 7 advantageously integrates third-party pager services with existing voice and data network services. The Invoice Processing System 128, through cooperative operation with the integration interface 126 which includes a number of upstream processing modules, provides for integrated customer invoicing of conventional and paging service and equipment charges.

A pager service provider 152 is depicted in FIG. 7 as being situated external to the billing system 125 of the telephony network 20, as is indicated by the dashed demarcation line. The pager service provider 152 typically offers a number of paging services in addition to equipment rental options.

Figure 8:
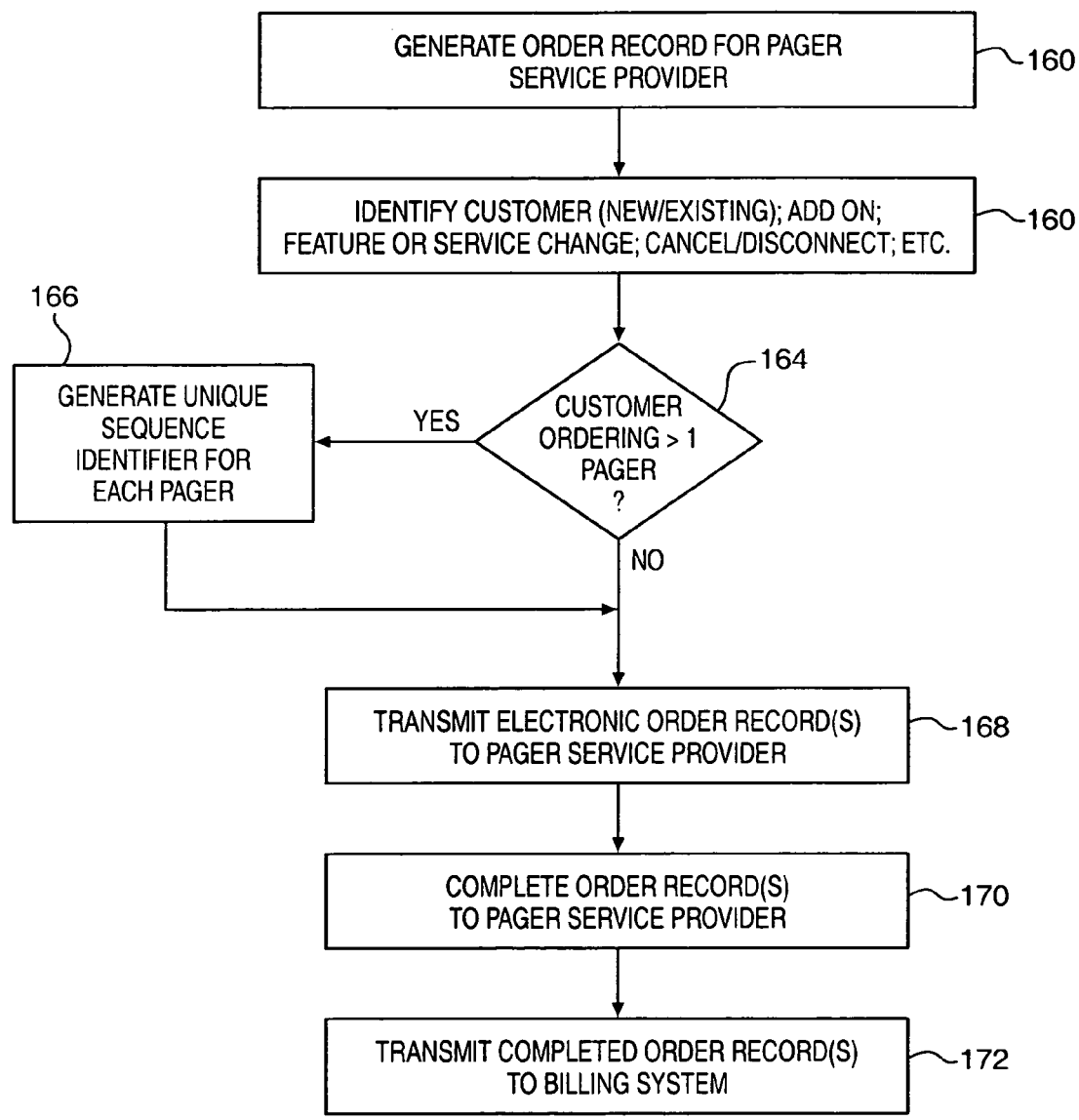
FIG. 8 illustrates in flow diagram form various steps associated with establishing an installment order for a pager unit provided to a telephony network customer by a pager service provider.

In accordance with one embodiment, and as depicted in the flow diagram of FIG. 8, the billing system 125 generates an order record 160 which is subsequently completed and returned by the pager service provider 152 in order to activate paging services for a particular customer. The billing system 125 includes a Customer Premise Equipment (CPE) module 144 which initiates the order record generation process. The order record generated by the CPE module 144 identifies 162 the customer and nature of the request. For example, the order record may identify whether the customer is a new or current customer, whether a new or add-on service or feature has been requested, whether a change in a particular service or feature has been requested, or whether cancellation of a service or disconnection of equipment has been requested.

If the CPE module 144 determines 164 that a particular customer is ordering more than one pager unit, for example, a unique sequence identifier is generated 166 for each pager associated with the particular customer. The order record is then transmitted 168 electronically to the pager service provider 152. The pager service provider 152 completes 170 the order record by inserting a unique pager identification number (PIN) code associated with each pager for a particular customer. The order record completed by the pager service provider 152 is then transmitted 172 to the CPE module 144 module of the billing system 125. The CPE module 144 generates a CPE charge record for each pager unit which is subsequently operated on by the IPS module 128. The CPE charge record information is ultimately reflected on a customer invoice 130 as an equipment charge at the appropriate location on the invoice 130.

The pager service provider 152 accumulates pager usage charges during a given period of time for all customers using paging services supported by the telephony network 20. Usage charge information for each customer and pager unit is transmitted by the pager service provider 152 to the Custom Billing Services (CBS) module 148 of the billing system 125. A standard file layout containing the information needed to determine how many pages a particular customer received is typically transmitted between the pager service provider 152 and CBS module 148 on a cyclical basis.

Figure 9:
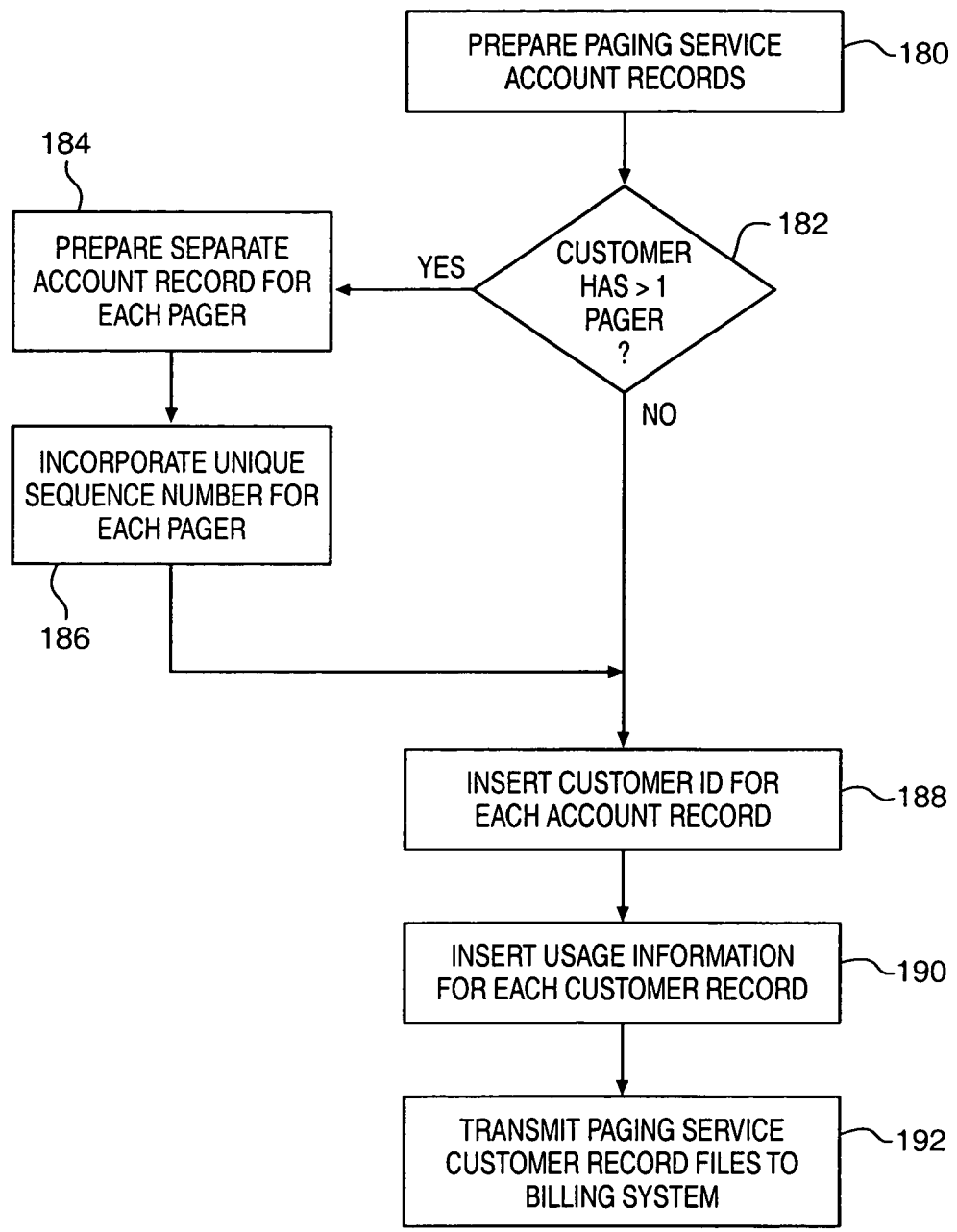
FIGS. 9-10 are flow diagrams that illustrate various steps involving the acquisition of paging equipment charge records provided by a pager service provider and various steps associated with the processing of pager and non-pager usage charges by an invoice processing system and methodology in accordance with an embodiment of the present invention.

As is shown in greater detail in FIG. 9, the pager service provider 152 prepares 180 a paging service account record for each pager associated with each customer. If a particular customer 182 has more than one pager, a separate account report is prepared 184 by the pager service provider 152 for each pager. As previously mentioned, a unique sequence number is incorporated 186 into the account record for each pager. The pager service provider 152 further inserts 188 customer ID information for each account record. Usage information computed by the pager service provider 152 is inserted 190 into each customer record. The customer records prepared by the pager service provider 152 are then transmitted 192 to the billing system 125 of the telephony network.

Figure 10:
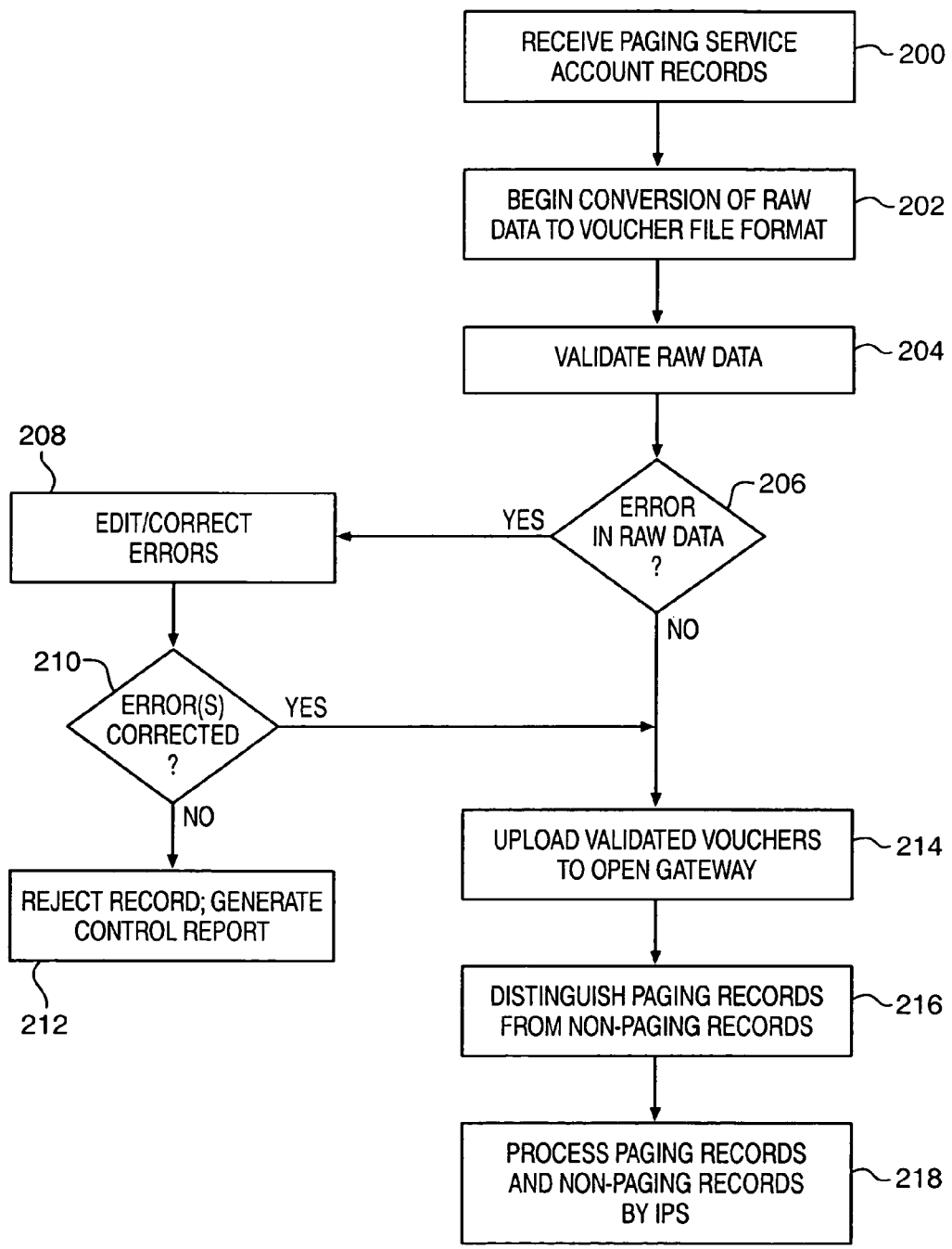
Figure 11:
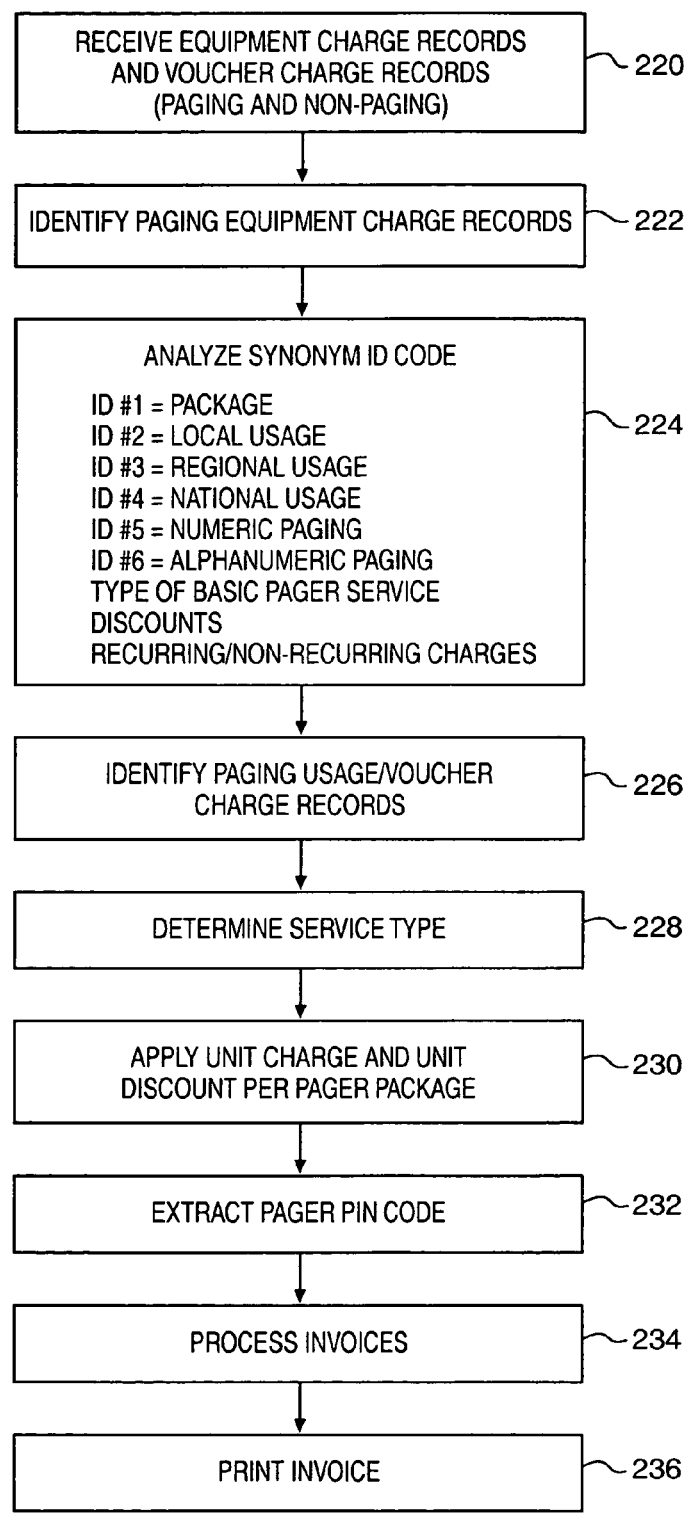
FIG. 11 depicts various process steps performed by the invoice processing system shown in FIG. 7 in connection with the production of customer invoices which include equipment and usage charge information for both paging and non-paging services.

Referring to FIGS. 7 and 10, the CBS module 148, upon receiving paging service account records 200 from the pager service provider 152, initiates conversion of the raw data contained within the account records to a voucher file format 202. The raw data, which is formatted according to the voucher file format, is validated 204 to verify the accuracy and integrity of the raw data supplied by the pager service provider 152. If errors are detected 206 in the raw data, edits are made 208 to correct the errors. If the errors cannot be corrected 210, the account record is rejected 212 and a control report is generated 212 by the CBS module 148 alerting system administrators as to the particulars of the unresolved errors.

Vouchers that have been validated by the CBS module 148 are uploaded 214 to an open gateway module 142. The open gateway module 142 distinguishes 216 paging usage records from non-paging usage records. Each voucher typically includes a service type field that specifies whether the voucher is associated with a paging service or a non-paging service. Voucher charge records are then further processed 218 by the Extract Load (XL) module 140 and IPS module 128.

Figure 12:
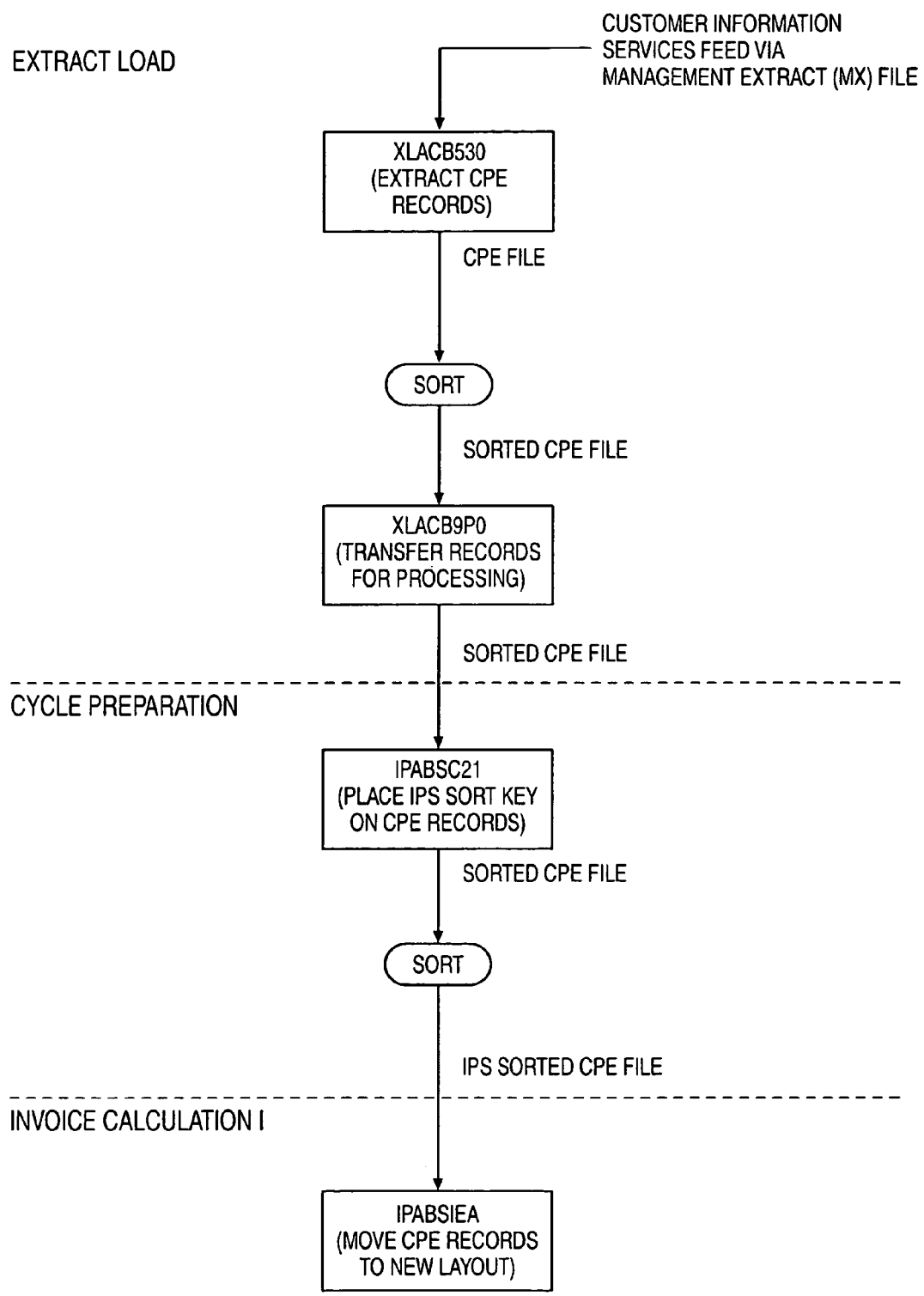
Figure 13:
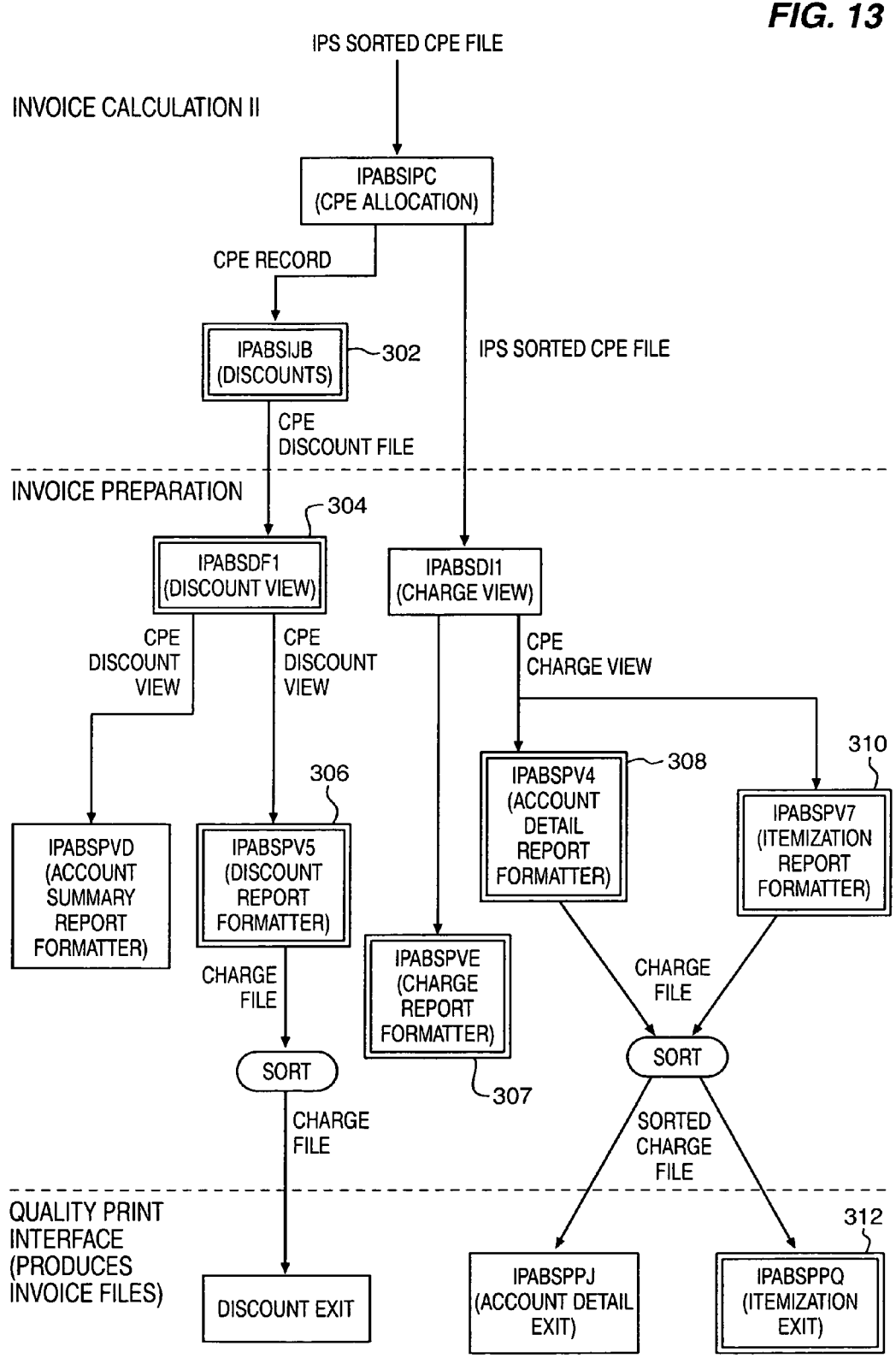
Figure 14:
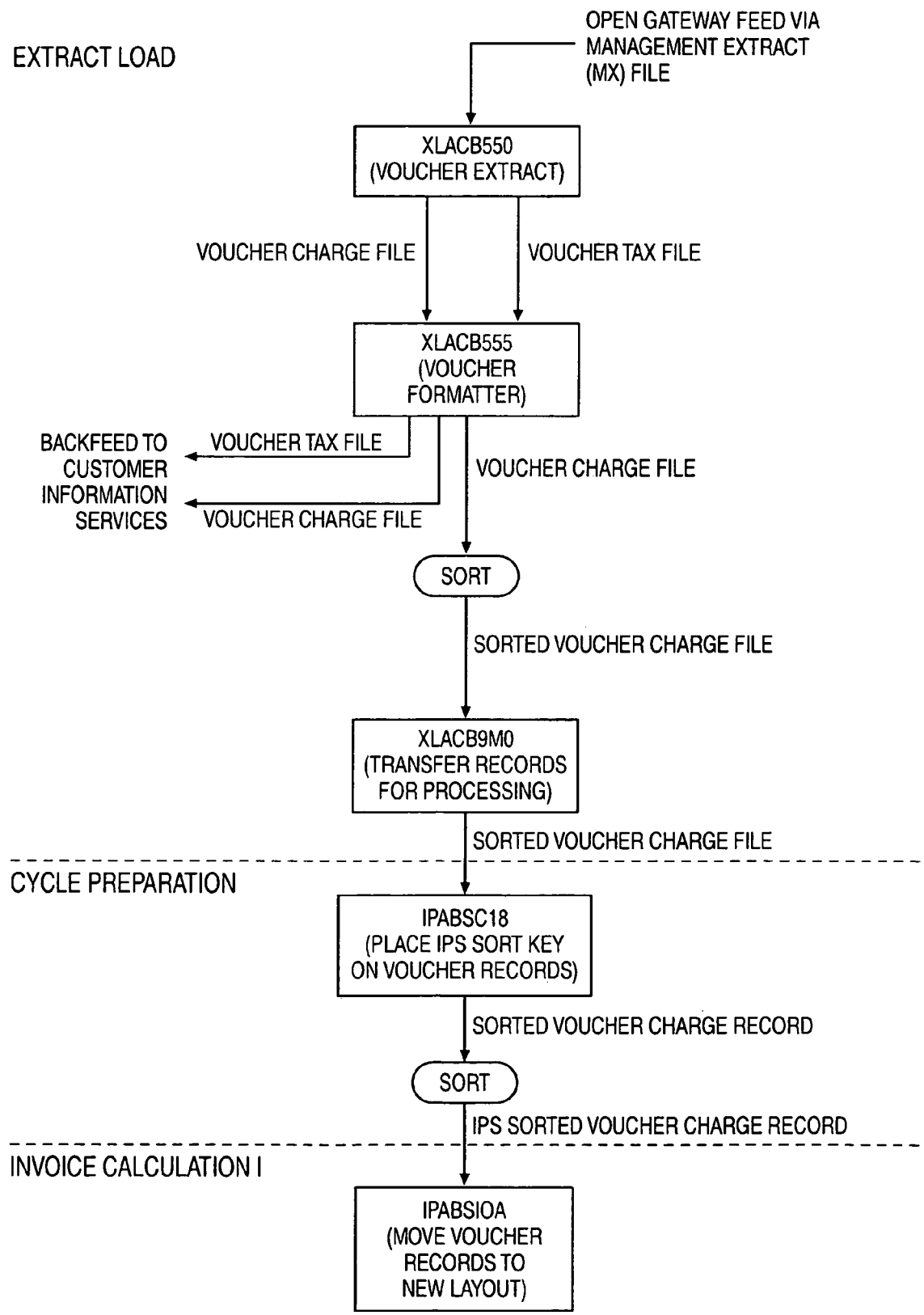
Figure 16A:

With reference to FIGS. 7, 11-15, there will be described in greater detail various operations performed by the extract load module 140 and the IPS module 128 concerning the processing of equipment charges, standard voice and data service charges, and pager service usage charges. It is noted that the processes depicted in FIGS. 12 and 13 are associated with processing of non-usage charges acquired/processed by the CPE module 144. The processes depicted in FIGS. 14 and 15 are associated with processing of usage charges (e.g., vouchers) acquired/processed by the CBS module 148.

The XL module 140 receives 220 equipment charge records from the CPE module 144 and voucher charge records from the CBS and open gateway modules 148, 142 associated with both paging and non-paging services. The XL module 140 sorts the CPE charge records, typically by customer, extracted from the CPE module 144 and transfers these records to the IPS module 128, as is depicted in FIG. 12. The IPS module 128 identifies 222 CPE charge records by analyzing 224 a synonym ID code embedded in each CPE charge record file.

The IPS module 128 analyzes 224 the synonym ID code of each CPE charge record, or file, in order to identify the service usage category associated with a particular customer's pager. For example, the synonym ID code #1 indicates that the customer has a package arrangement under which various services and features are bundled together along with rental of a paging unit. Other synonym ID codes indicate whether a particular customer paging unit has associated with it local, regional, or national usage services, numeric paging, alphanumeric, paging, and what type of basic pager service has been established for the particular pager unit. The synonym ID code may also include information concerning the application of various types of discounts and, whether charges are recurring or non-recurring. A generalized flow diagram concerning the processing of CPE charge records is illustrated in FIG. 13.

The IPS module 128 also identifies 226 paging usage records in the form of voucher charge records received from the XL module 140. The IPS module 128 determines the rate for the service associated with each voucher charge record and applies 230 the appropriate unit charge, previously determined by the CBS module 148, and unit discount rates for each pager package. The pager PIN code for each voucher charge record is extracted 232 so as to uniquely identify all charges associated with each pager possessed by a particular customer.

Reference is made to FIGS. 14 and 15 which depict various steps concerning the processing of voucher charge records performed by the IPS module 128. Using the CPE and voucher charge record information, the IPS module 128 processes 234 customer invoices and locates usage and non-usage charges for standard services as well as pager services on each customer invoice 130. The invoices are printed 236 and then dispatched to individual customers.

Additional features and aspects of the process flow diagrams of FIGS. 12-15 and invoice depictions of FIGS. 16A-16G will now be described in greater detail. As is shown in FIG. 13, CPE charge records are processed by a discount and promotion accumulation module 302. The discount module 302 differentiates paging item level discounts from other item level discounts. A field in the CPE record files received by the IPS module 128 is used to identify paging item level discounts.

Each paging item level discount is written to a discount file separately and can be identified as relating to paging services using a paging switch field, such as by setting the paging switch field to "Y" for indicating paging. It is noted that the discount module 302 also processes voucher records, as is shown in FIG. 15, in a similar manner with respect to voucher discount files. It is further noted that the voucher charge processing module 309 shown in FIG. 15 moves the fields needed to process the voucher records in the voucher file to a voucher external view.

CPE discount files are then further processed for purposes of preparing customer invoices. A discount activity module 304 identifies CPE discount files that include an appropriately set paging indicator flag. The activity module 304 moves the new discount file paging indicator flag to the CPE discounts view paging indicator flag, which is used to identify paging discounts.

A charge report formatter module 307 provides for the displaying of one or more pager identification numbers (PINs) in the description of the invoice. FIGS. 16E-16G illustrate charges associated with each of a number of pager units identified by a unique identification number in the itemization of charges portion of the customer invoice. The PIN number is typically displayed on the Monthly One Time Charge invoice page in the Reference ID column.

A charges extract module 308, shown in both FIGS. 13 and 15, processes special product (i.e., operator dispatch) voucher charges acquired through the open gateway 144 for placement on the customer invoice. A standard header, such as 'Operator Dispatch Charges' shown in the Account Detail portion of the customer invoice in FIG. 16E, is placed on the invoice to represent these paging usage charges.

In addition, the charges extract module 308 recognizes equipment records acquired through the CPE system. As such, the charges extract module 308 differentiates non-pager related CPE equipment records from company pager equipment records, This level of differentiation is needed to show the appropriate charge description on the invoice report.

A discounts extract module 306 provides for the processing of paging discounts. Paging discounts are identified by the new paging indicator at the end of the CPE discount view. All paging item level discounts are stored in an internal array until the end of account processing, at which point they are written to the invoicing file. FIG. 16E illustrates a summary of discounts presented on a customer invoice.

An itemization report formatter module 310 provides for the creation of an itemization of charges report. A voucher view is provided to enable the itemization report formatter module 310 to process special product (e.g., operator dispatch) voucher charges acquired through the open gateway 144 for placement on the customer invoice. FIGS. 16E-16G illustrate an itemized listing of charges associated with a number of paging units presented on a single composite customer invoice. The charge text description lines in the voucher view for the date and the charge description fields are moved to the invoice report record by the itemization report formatter module 310.

A CPE view is also included as part of the itemization report formatter module 310 to enable the module 310 to process customer premise equipment information. In particular, the itemization report formatter module 310 differentiates between non-pager related CPE equipment records and company pager equipment records. This level of differentiation is required in order to include the appropriate text description on the customer invoice report. Non-paging equipment records are typically given a default description of 'Equipment.'

The itemization of charges report exit module 312 produces print files for equipment and voucher charges that appear on a customer invoice.

The foregoing description of the various embodiments of the invention has been presented for the purposes of illustration and description. It is not intended to be exhaustive or to limit the invention to the precise form disclosed. For example, the consolidated billing system disclosed herein may accommodate billing requirements from services other than those offered by a pager service provider. Further, the telephony network depicted herein may constitute a fiber-optic network, a digital network, a hybrid analog/digital network, or other type of telephony network. Many modifications and variations are possible in light of the above teaching. It is intended that the scope of the invention be limited not by this detailed description, but rather by the claims appended hereto.

What we claim is:

1. A method of billing, the method comprising:

in a billing system for a communication network operated by a first service provider, generating account information related to provisioning a communication service from a third-party network for a customer, wherein the third-party network is operated by a second service provider;

receiving network information of the first service provider from the communication network into the billing system;

in the billing system, processing the network information to determine network charges related to usage of the communication network of the first service provider by the customer;

receiving third-party information in a standard file layout from the third-party network into the billing system, wherein the standard file layout comprises service account records, wherein the service account records comprise an identifier for the customer and usage charge information for the customer associated with the communication service from the third-party;

in the billing system, processing the third-party information to identify the account information, detect errors in the third-party information, and extract the third-party information from the standard file layout;

in the billing system, processing the third-party information extracted from the standard file layout to determine third-party charges related to usage of the third-party network by the customer;

in the billing system, calculating a single invoice for the customer that includes the network charges and third-party charges; and in the billing system, generating the single invoice.

2. The method of claim 1 wherein the account information is an account record for the communication service.

3. The method of claim 1 wherein the network charge is an equipment charge.

4. The method of claim 1 wherein calculating the single invoice is based on a customer profile and further comprises identifying the customer profile for the customer.

5. The method of claim 1 wherein calculating the single invoice further comprises calculating a discount.

6. The method of claim 1 wherein calculating the single invoice comprises calculating taxes.

7. The method of claim 1 wherein calculating the single invoice comprises verifying the calculation of the single invoice.

8. The method of claim 1 further comprising:

generating and transmitting an order record to the third-party network; and receiving and processing a response to the order record from the third-party network.

* * * * *